UNITED STATES PATENT OFFICE.

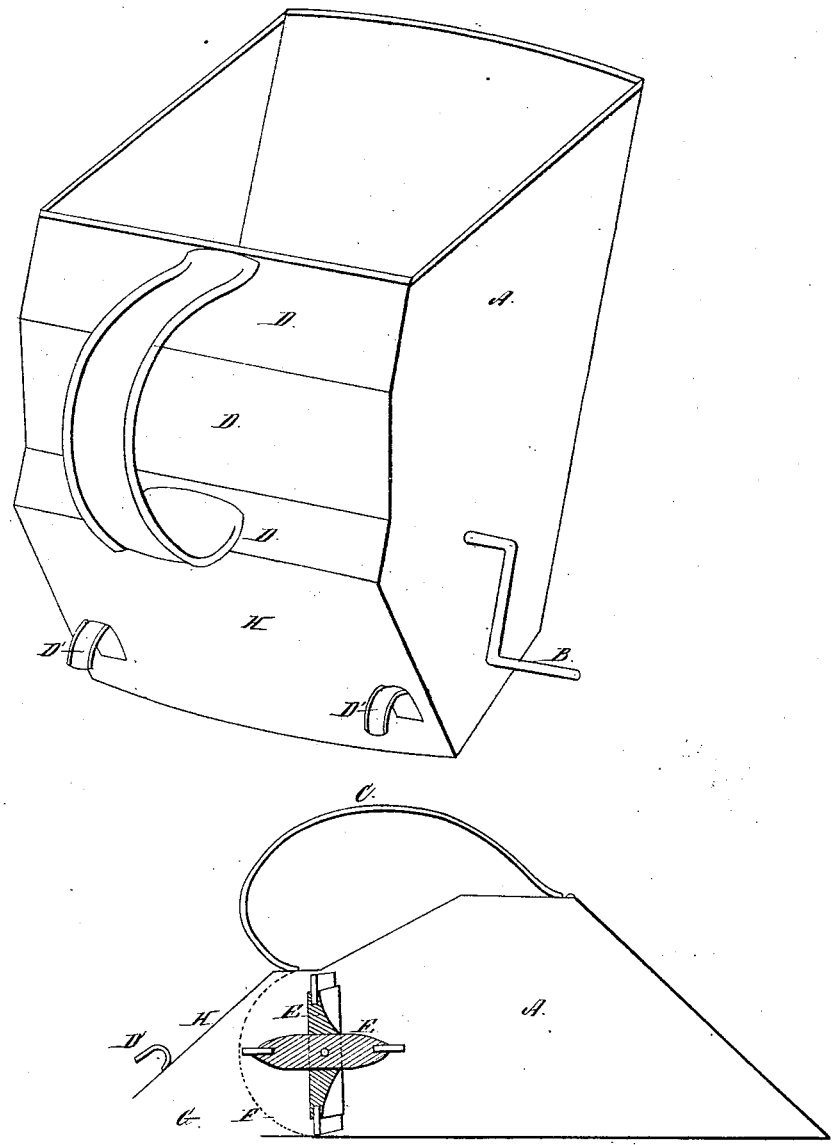

GEORGE S. WENDELL, OF NEW YORK, N. Y., ASSIGNOR TO J. HORACE TAYLOR, OF SAME PLACE.

SCOOP AND FLOUR-SIFTER.

Specification forming part of Letters Patent No. 51,525, dated December 12, 1865.

*To all whom it may concern:*

Be it known that I, GEORGE S. WENDELL, of the city of New York, in the county and State of New York, have invented a new and useful Improvement in Flour Scoop and Sifter Combined; and I do hereby declare that the following is a full, clear, and exact description thereof, reference being had to the accompanying drawings, and to the letters of reference marked thereon, in which—

Figure I is a perspective view of the scoop and sifter. Fig. II is a sectional view of the same.

In Fig. I, A is the main body of the scoop; B, the crank by which to turn the shaft; C, the handle by which to hold the scoop; D' D', the hooks which rest on the edge of the pan or vessel into which the flour is sifted to steady the sifter while in operation.

In Fig. II corresponding letters represent the same as in Fig. I, and E the revolving shaft or rubber; F F, the wire screen; G, the opening at the back end of the scoop for the exit of the flour.

The object of my invention is to construct a machine which shall answer the double purpose of a scoop and flour-sifter.

To enable others skilled in the art to make and use my invention, I will proceed to describe its construction and operation.

I form my scoop with an opening, G, at the back end to allow the flour to pass out after it has passed through the screen. In the back end of the scoop I attach the wire screen F F in a semicircular form, within which I place a revolving shaft in such a manner as to allow the rubbers attached to the shaft to come in contact with the screen. To the top D of the scoop I attach the handle C, by which to hold the sifter. To the back end of the scoop I place the two hooks D' D' on a shield-plate, H, to rest on the rim of the pan and help to steady the sifter. This shield-plate H not only guides the flour downward, but serves as a support for the resting-hooks D'.

The advantages of my scoop and sifter are, that while it answers a double purpose, it is compact, and while not in use can be thrown into the flour barrel or bucket, out of the way. It also prevents scattering the flour over the table, as the flour is sifted directly from the sifter into the kneading-pan.

I do not claim, broadly, a combined scoop and sifter; but,

Having described my invention, what I claim as new, and desire to secure by Letters Patent of the United States, is—

A combined scoop and sifter when arranged with the handle C located as described, having the shield-plate H behind the wire screen F, and with the hooks or rests D' attached to said plate H, substantially as set forth, for the purpose mentioned.

GEORGE S. WENDELL.

Witnesses:
GREENLEAF STACKPOLE,
H. DRENNON.